United States Patent Office 3,068,203
Patented Dec. 11, 1962

3,068,203
PROCESS FOR THE PRODUCTION OF
POLYMERIZATES OF ACROLEINS
Otto Schweitzer, Konigstein, Taunus, Germany, assignor to Deutsche Gold- und Silber-Scheideanstalt vormals Roessler, Frankfurt am Main, Germany
No Drawing. Filed Feb. 2, 1959, Ser. No. 790,385
Claims priority, application Germany Feb. 5, 1958
4 Claims. (Cl. 260—67)

The present invention relates to the production of polymerizates of acroleins and alpha substituted acroleins.

It has long been known that acrolein polymerizes spontaneously. (J. Redtenbacher, Liegbigs Ann. 47, 113 (1843); A. Wöhlk, J. prakt. Chem. 61, 200 (1900); J. U. Nef, Liebigs Ann. Chem. 335, 191, 221 (1904); G. Lockemann and O. Liesche, J. prakt. Chem. 71, 483 (1905).)

A polymerization of acrolein can also be effected with the aid of ultra violet light (F. E. Blacet, G. H. Fielding and J. G. Roof, J. Amer. Chem. Soc. 59, 2375 (1937)).

The polymerization of acrolein can also be effected with the aid of various types of catalysts. In these instances either completely cross-linked polymers are obtained which give no aldehyde reactions or only relatively low molecular weight acrolein homopolymers are obtained. (H. Schulz and H. Wagner, Angew. Chem. 62, 112 (1950); German Patents 733,125; 745,422; 748,690; French Patent 1,138,854.)

Furthermore, the usual radical forming catalysts initiate the polymerization of acrolein. For example, a soluble polyacrolein having a molecular weight of 1310 can be obtained by the polymerization of acrolein in a benzene-methanol mixture in the presence of azoisobutyric acid nitrile for 24 hours at 85° C. (U.S. Patent 2,657,192). When the polymerization is initiated with azo compounds or peroxides, higher reaction temperatures are always required.

The ionic polymerization of acrolein either leads to cross-linked or low molecular weight products, which in the most favorable instances still contain 20% of the original aldehyde groups.

The object of this invention is to produce high molecular weight polymers of acrolein and alpha substituted acroleins using a catalytically initiated polymerization. Another object of this invention is to produce such acrolein and alpha substituted acrolein polymers as are water soluble.

It has now been found, according to this invention, that polymerizates possessing interesting properties are produced if the polymerization of acrolein or its alpha substituted derivatives, such as alpha-alkyl acroleins, for example, alpha ethyl or alpha methyl acrolein, is carried out in the presence of sulfurous acid or sulfurous acid anhydride as a catalyst. Preferably, the non-substituted acroleins are used in the process according to this invention. It is also possible to carry out this process under pressure in the presence of an excess of sulfur dioxide. In addition, the process according to this invention can also be conducted with the aid of bisulfite solutions, such as solutions of sodium bisulfite, with the bisulfite acting as the catalyst in this case.

In general, it is sufficient to conduct the polymerization in the presence of relatively small amounts of these catalysts; such as, for example, for the sulfurous acid or sulfurous acid anhydride 3 parts per 100 parts of acrolein; an excess of $SO_2$ would be 10 parts per 100 parts of acrolein; and 4 parts of bisulfite per 100 parts of acrolein.

The polymerization according to this invention can take place in situ. It can also be carried out in the presence of organic solvents. In general, however, it is expedient to carry out the polymerization in an aqueous system. An aqueous solution of acrolein can, for example, be used for the polymerization since at room temperature acrolein is soluble in water in amounts of up to 20%. In most cases, however, it is advantageous to use larger amounts of acrolein. This can be achieved by using an aqueous emulsion of acrolein or its alpha substituted derivatives. Thus, as the insoluble polymerizates are formed in the batch from the dissolved acrolein, more of the emulsified acrolein goes into solution so that in a short time the acrolein in the entire emulsion can be converted into the insoluble polymerizates. When working with an emulsion, it is expedient to add a wetting agent, for example, polyvinylether or polyetheneoxides.

Where the polymerization is carried out in the presence of an organic solvent, the solvent should be so selected that the monomeric acrolein is soluble in it but the polymerization product precipitates out from it. Suitable solvents, for example, are hydrocarbons, esters, ketones and alcohols.

The polymerization can be carried out according to this process at temperatures preferably from 0°–30° C., but also elevated temperatures can be used. The polymerization reaction is exothermic. When working with larger quantities of the acroleins it is expedient to cool the reaction mixture in order to carry off the heat of the reaction and prevent the reaction from running away with itself.

The polymerizates obtained by the process according to this invention have high molecular weights, are insoluble in water and most other solvents and can be used as films, coatings, textile finishers and the like. The molecular weight of the polymerizates obtained by this process usually ranges from about 25,000 to about 500,000.

It was also unexpectedly discovered that water soluble polymerizates of acrolein or its alpha substituted derivatives can be produced in a working process if, at the outset, such a large amount of sulfurous acid or sulfurous acid anhydride is used that the resulting polymerizates themselves react with the sulfurous acid and in that manner the polymerizates are changed to a water soluble form. It has therefore become possible, in this manner, to produce water soluble high polymer acrolein derivatives in one working operation.

*Example 1*

Freshly distilled acrolein was subjected to a weak stream of $SO_2$ gas for 1 to 2 minutes. A polymerizate of acrolein was thereby formed, which was drawn off by suction from the unreacted acrolein, washed and dried. The yield amounted to 36% of the theoretically possible yield.

*Example 2*

100 g. of acrolein were emulsified in 300 g. of water. $SO_2$ gas was introduced into this emulsion through a tube for one minute while stirring. When the temperature of the mixture reached 27° C., the inflow of $SO_2$ gas was cut off. The temperature continued to rise to 43° C. After the mixture had been left to stand for several hours the precipitated polymerizate was filtered off on a suction filter, washed with water and dried in a vacuum over calcium chloride. The yield amounted to 65%.

*Example 3*

100 g. of acrolein were emulsified in 300 g. of a 2% aqueous solution of a polyvinylether, polyvinylmethylether, as a wetting agent and the procedure was further conducted as in Example 2. The yield was 67% of the theoretical.

Example 4

This example was executed in the same manner as Example 2 except that the precipitated polymerizate was emulsified again and SO$_2$ gas was introduced into this emulsion until a viscous solution of the polymerizate was obtained. Of course an isolation of the precipitate was not necessary. The further introduction of SO$_2$ gas can be carried out in one stage.

I claim:

1. Process for homopolymerization of a monomer selected from the group consisting of acrolein and alpha substituted acroleins which comprises polymerizing an aqueous emulsion of said acrolein monomer at a temperature of at least approximately 0° to 30° C. in admixture with at yeast about 3 parts by weight per 100 parts by weight of acrolein monomer of a catalyst solely consisting of a sulfur dioxide compound of the group consisting of sulfurous acid, sulfurous acid anhydride and sodium bisulfite.

2. A process as in claim 1 in which the polymerization is conducted in the presence of a polyvinyl ether, as a wetting agent.

3. A process as in claim 1 in which the polymerization is conducted at room temperatures.

4. A process as in claim 1 in which the polymerization is conducted in the presence of at least 10 parts by weight of SO$_2$ per 100 parts of monomeric acrolein.

References Cited in the file of this patent
UNITED STATES PATENTS

| | | |
|---|---|---|
| 2,098,108 | Reppe et al. | Nov. 2, 1937 |
| 2,114,292 | Frey et al. | Apr. 19, 1938 |
| 2,212,894 | Allen | Aug. 27, 1940 |
| 2,559,749 | Benning | July 10, 1951 |
| 2,580,315 | Park | Dec. 25, 1951 |
| 2,809,185 | Hearne et al. | Oct. 8, 1957 |
| 2,819,252 | Shokal | Jan. 7, 1958 |